(12) United States Patent
Liu

(10) Patent No.: US 11,565,773 B1
(45) Date of Patent: Jan. 31, 2023

(54) GEAR SWITCHING CONTROL DEVICE OF AN INTERNAL DERAILLEUR

(71) Applicant: Jen-Chih Liu, Taipei (TW)

(72) Inventor: Jen-Chih Liu, Taipei (TW)

(73) Assignee: NEW KAILUNG GEAR CO., LTD, Kaohsiung (TW)

( * ) Notice: Subject to any disclaimer, the term of this patent is extended or adjusted under 35 U.S.C. 154(b) by 0 days.

(21) Appl. No.: 17/671,605

(22) Filed: Feb. 15, 2022

(51) Int. Cl.
*F16H 61/686* (2006.01)
*B62M 11/16* (2006.01)
*F16H 63/30* (2006.01)

(52) U.S. Cl.
CPC .......... *B62M 11/16* (2013.01); *F16H 61/686* (2013.01); *F16H 63/30* (2013.01); *F16H 2200/201* (2013.01)

(58) Field of Classification Search
CPC ....... B62M 11/16; F16H 61/686; F16H 63/30; F16H 2200/201
See application file for complete search history.

(56) References Cited

U.S. PATENT DOCUMENTS

2009/0131214 A1 * 5/2009 Okoochi ............... F16D 41/067
475/312

FOREIGN PATENT DOCUMENTS

CN 106763570 A * 5/2017
CN 108266501 A * 7/2018 ............ B62M 11/14

* cited by examiner

*Primary Examiner* — Justin Holmes

(57) ABSTRACT

A gear switching control device of an internal derailleur includes a plurality of planet gear speed change systems; a gear switching control unit; a plurality of axial ratchet control rings for controlling action of a plurality of axial ratchets; a plurality of axial ratchets; and the plurality of axial ratchet control rings are serially connected by the same gear switching control unit; characteristic in that: a gear switching control unit comprising: a track sleeve, one end of the track sleeve is installed with force accept portion and another end thereof is installed with a linking rod which IS used to serially connected a plurality of axial ratchet control rings; each of the axial ratchet control rings is formed with a respective connecting holes; each axial ratchet control ring being installed a cam or cam-like device; various cam having different operating moving range.

7 Claims, 7 Drawing Sheets

GEAR SWITCHING CONTROL DEVICE OF AN INTERNAL DERAILLEUR

FIELD OF THE INVENTION

The present invention relates to derailleurs, and in particular to a gear switching control device of an internal derailleur.

BACKGROUND OF THE INVENTION

The technology of interior derailleurs of bicycles is known in the art and used commonly. Many different technologies provide different speed change ratios based different technical theories. However, these differences affect the structures and effects of the bicycles. Furthermore, there are many new designs which provide useful effects, but they still have defects in use. Therefore they are not practical due to the defects in applications.

For multiple stage speed change designs which are variable based on the users. For example, sporters like multiple stage speed change design with many speed change stages, while people used in daily life likes speed change of just few stages, generally, it has three or four change stages. Therefore, fewer change stage design has wide markets and are acceptable widely, and also suitable under consideration of economics. In general, three or fourth speed changes are widely used.

However, for derailleurs with fewer speed change stages, they have a defect of temporarily jump in change of gears which causes the unsmooth in driving bicycles. For a fourth speed change design, only fewer layer (two layers) planet gear speed change system is used. When changing from 2 stage to three stage, the closing of the axial ratchet in the first planet gear speed change system for control the sun gear to be fixed or freely rotating is operated along an inverse direction, as a result, in operation, a great torque is needed. Furthermore, in mechanical structure, the axial ratchet of the first planet gear speed change system close firstly, while the axial ratchet of the second planet gear speed change system does not open, the speed auto-changes to the first speed and then to the third speed. Or the axial ratchet of the first planet gear speed change system does not close firstly, while the axial ratchet of the second planet gear speed change system has opened, the speed auto-changes to the fourth speed and then to the first speed. However, these phenomenon will induce the temporary speed jump and thus the operation is not smooth.

SUMMARY OF THE INVENTION

Accordingly, the object of the present invention is to provide a gear switching control device of an internal derailleur, advantages of the present invention are that:

The present invention could resolve the problem induced from the gear change of internal derailleurs of two layer planet gear speed change system.

The present invention has a simple structure, lower torque, and lower power which is novel, practical and progressive.

Each layer of the planet gear speed change system has identical speed change ratio and as a result, and thus they have same module structure. The cost is reduced effectively and the manufacturing steps are simplified.

To achieve above object, the present invention provides al. A gear switching control device of an internal derailleur, comprising:

a plurality of planet gear speed change systems;
a gear switching control unit;
a plurality of axial ratchet control rings a number of which is identical that of the planet gear speed change systems for controlling action of a plurality of axial ratchets;
a plurality of axial ratchets the number of which is identical to that of the axial ratchet control rings; and the plurality of axial ratchet control rings are serially connected by the same gear switching control unit; characteristic in that:

a gear switching control unit comprising: a track sleeve (2), one end of the track sleeve (2) is installed with force accept portion (2a) and another end thereof is installed with a linking rod (2b) which IS used to serially connected a plurality of axial ratchet control rings (21, 22 and 23);

each of the axial ratchet control rings (21, 22 and 23) is formed with a respective connecting holes (21a, 22a and 23a); each axial ratchet control ring (21, 22 and 23) being installed a cam or cam-like device; various cam having different operating moving range.

For the gear switching control device of an internal derailleur, an interior of the internal derailleur includes the plurality of planet gear speed change systems, between a sun gear (3) of each planet gear speed change system has a sun gear (3) and a wheel shaft (1) of the internal derailleur is installed with a respective axial ratchet (17); all the axial ratchets (17) are controlled by the same track sleeve (2).

For the gear switching control device of an internal derailleur, each of the axial ratchet control rings (21, 22 and 23) are formed with the respective connecting holes (21a, 22a and 23a) for receiving the track sleeve (2); each of the axial ratchet control ring (21), the second axial ratchet control ring (22) and the third axial ratchet control ring (23) is installed with a cam or cam like device; each of these cams or cam-like devices includes respective derailleur closing surfaces (21b, 22b, and 23b) and respective derailleuring opening surfaces (21c, 22c, and 23c) for derailleuring the axial ratchet (17); moving radial ranges of the respective derailleur closing surfaces (21b, 22b, and 23b) are different from each other, and moving radial ranges of the respective derailleur opening surfaces (21c, 22c, and 23c) are different from each other For the gear switching control device of an internal derailleur, there are three planet gear speed change systems in the internal derailleur; in the first derailleuring position, in that the track sleeve (2) dose not act; the axial ratchet (17) of the first planet gear speed change system is in the radial range of the derailleur closing surface (21b) of the first axial ratchet control ring (21); therefore the axial ratchet (17) of the first planet gear speed change system causes the sun gear (3) of the first planet gear speed change system is in a free state without being fixed; the axial ratchet (17) of the first planet gear speed change system is in the radial range of the derailleur closing surface (21b) of the first axial ratchet control ring (21); therefore the axial ratchet (17) causes the sun gear (3) of the first planet gear speed change system is in a free state without being fixed; the axial ratchet (17) of the second planet gear speed change system is in the radial range of the derailleur closing surface (22b) of the second axial ratchet control ring (22); therefore the axial ratchet (17) of the second planet gear speed change system causes the sun gear (3) of the second planet gear speed change system is in a free state without being fixed; the axial ratchet (17) of the third planet gear speed change system is in the radial range of the derailleur closing surface (23b) of the third axial ratchet control ring (23); therefore the axial ratchet (17) of the third planet gear speed change system causes the sun gear (3) of the third planet gear speed change system is in a free state without being fixed; that is, all the sun gears (3) are in free rotation state without being fixed.

For the gear switching control device of an internal derailleur, there are three planet gear speed change systems in the internal derailleur; in a second position, the track sleeve (2) is in a second gear position as it is switched from a first gear position to the second gear position, the axial ratchet (17) of the first planet gear speed change system is in the in the radial range of the derailleur opening surface (21c) of the first axial ratchet control ring (21), as a result, the axial ratchet (17) of the first planet gear speed change system causes that the sun gear (3) of the first planet gear speed change system is fixed; the axial ratchet (17) of the second planet gear speed change system is within the radial range of the derailleur closing surface (22b) of the second axial ratchet control ring (22) so that the axial ratchet (17) of the second planet gear speed change system causes that the sun gear (3) of the second planet gear speed change system is in a free rotating state; the axial ratchet (17) of the third planet gear speed change system is within the radial range of the derailleur closing surface (23b) of the third axial ratchet control ring (23), as a result, the axial ratchet (17) of the third planet gear speed change system causes the sun gear (3) of the third planet gear speed change system is in a free rotating state; at this moment, the axial ratchet (17) of the first planet gear speed change system is in a derailleur opening state, that is, the sun gear (3) of the first planet gear speed change system is fixed, while the axial ratchets (17) of the second and third planet gear speed change systems are in derailleur closing state, that is, the sun gears of the second and third planet gear speed change systems are in a free rotation state.

For the gear switching control device of an internal derailleur, there are three planet gear speed change systems in the internal derailleur; the track sleeve (2) of the gear switching control structure is switched from second gear position to third gear position; in the third gear position, the axial ratchets (17) of the first and second planet gear speed change system is within a radial range of the derailleur opening surface (21c) of the first axial ratchet control ring (21) so that the axial ratchets (17) of the first and second planet gear speed change system causes that the sun gears (3) of the first and second planet gear speed change system are fixed; the axial ratchet (17) of the third planet gear speed change system is positioned within the radial range of the derailleur closing surface (23b) of the third axial ratchet control ring (23) so that axial ratchet (17) of the third planet gear speed change system causes that the sun gear (3) of the third planet gear speed change system is still in a free rotation state; at this time, the axial ratchets (17) of the first and second planet gear speed change system is in a derailleur opening state, that is, the sun gear (3) is in a fixed state, while the axial ratchet (17) of the third planet gear speed change system is in a derailleur closing state and the sun gear (3) thereof is in a free rotation state.

For the gear switching control device of an internal derailleur, there are three planet gear speed change systems in the internal derailleur; the track sleeve (2) of the gear switching control structure is switched from third gear position to fourth gear position; in the fourth gear position, the axial ratchets (17) of the first planet gear speed change system is positioned in a radial range of the derailleur opening surface (21c) of the first axial ratchet control ring (21), thereby, the axial ratchet (17) of the first planet gear speed change system causes the sun gear (3) of the first planet gear speed change system is in a fixed state; the axial ratchet (17) of the second planet gear speed change system is positioned in a radial range of the derailleur opening surface (22c) of the second axial ratchet control ring so that the axial ratchet (17) of the second planet gear speed change system causes that the sun gear (3) of the second planet gear speed change system is in a fixed state; the axial ratchet (17) of the third planet gear speed change system is positioned in the radial range of the derailleur opening surface (23c) of the third axial ratchet control ring, as a result, the axial ratchet (17) of the third planet gear speed change system causes that the sun gear (3) of the third planet gear speed change system is in a fixed state; at this moment, the axial ratchets (17) of the first to third planet gear speed change system are in a derailleur opening state; that is, all the sun gears (3) are in a fixed state.

By the rotation of the track sleeve of the gear switching control unit, each ratchet control ring controls the axial ratchet switch of a respective planet gear speed change system so as to affectively resolve the speed delay in gear change period of a prior art bicycle derailleur having two layers of planet gear speed change systems. Furthermore, controlling of gear switching is simplified, light torque with less power.

BRIEF DESCRIPTION OF THE DRAWINGS

FIG. 23-1 is a state schematic view showing the operation state in the first derailleur stage according to the present invention.

FIG. 23-2 is a state schematic view showing the operation state in the second derailleur stage according to the present invention.

FIG. 23-3 is a state schematic view showing the operation state in the third derailleur stage according to the present invention.

FIG. 23-4 is a state schematic view showing the operation state in the fourth derailleur stage according to the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
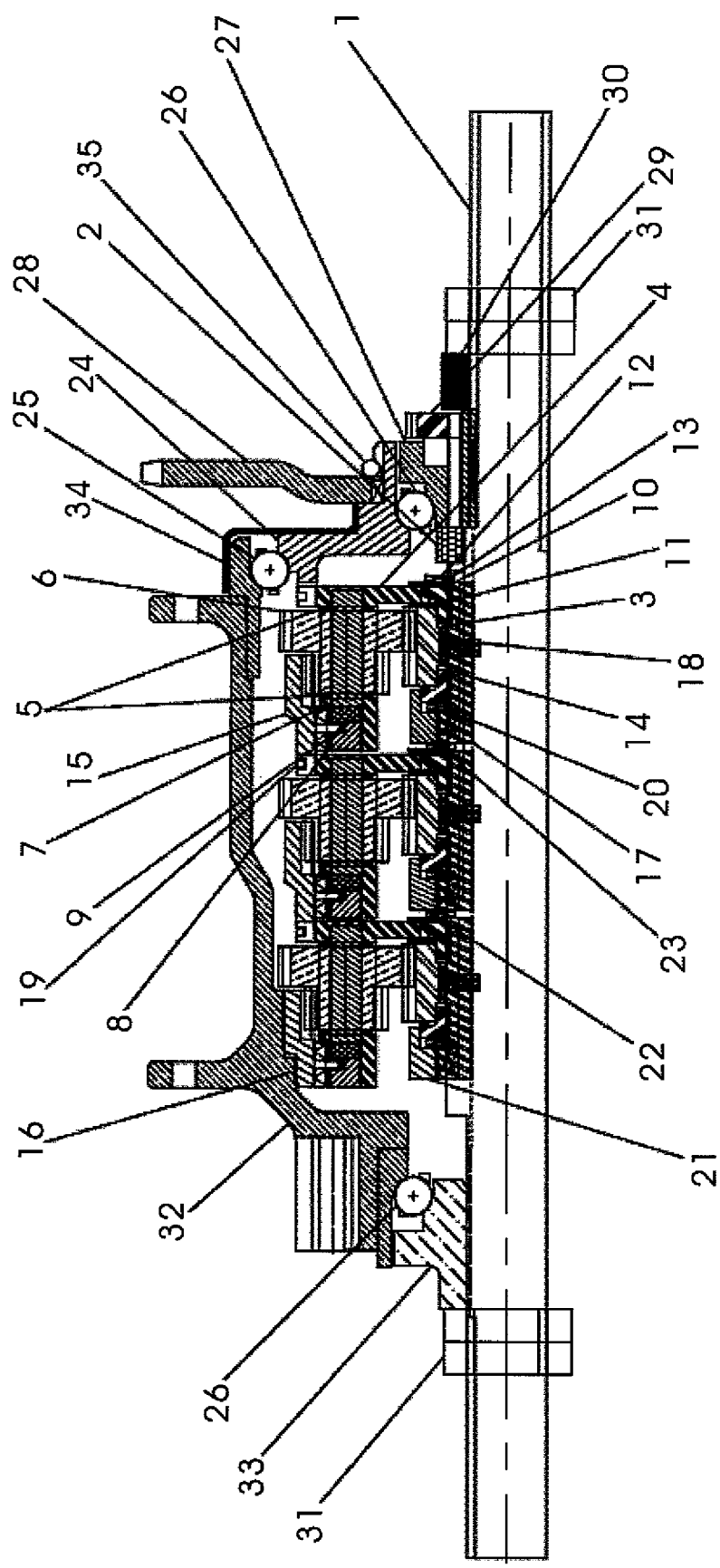
FIG. 1 is a cross sectional schematic view of the embodiment of the present invention.
Figure 2:
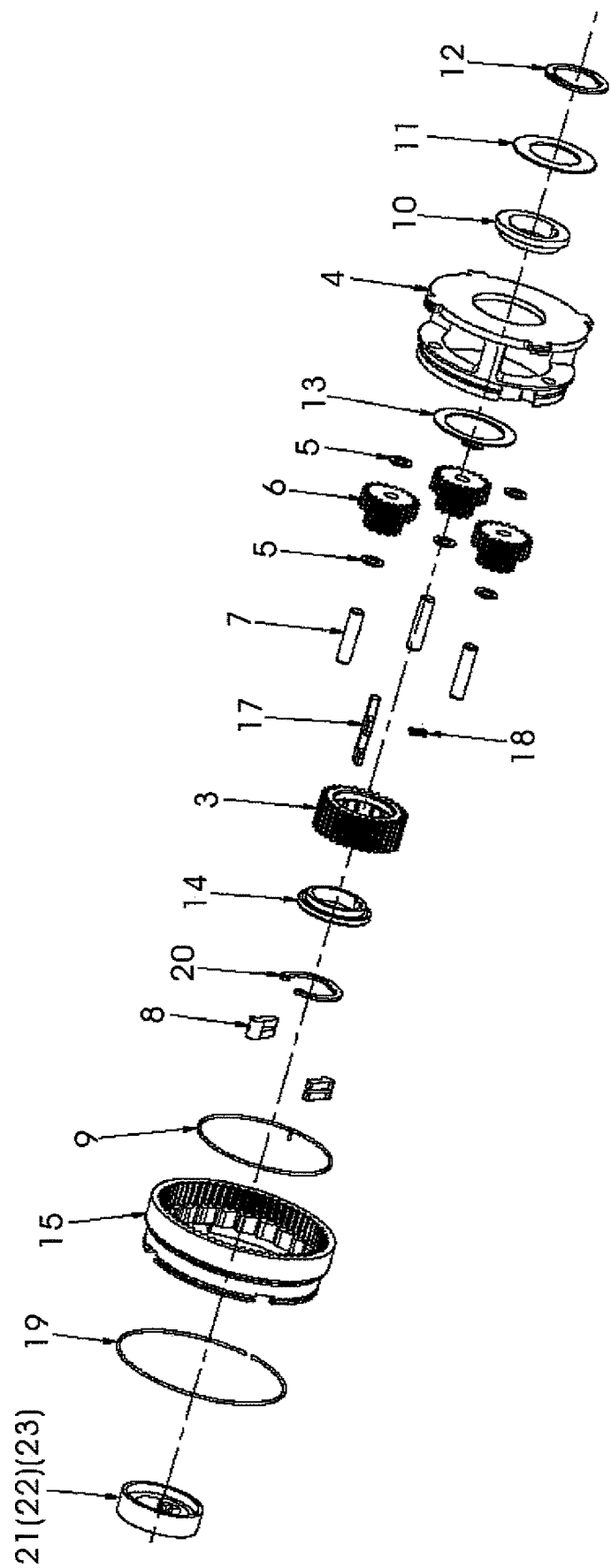
FIG. 2 is an assembly schematic view showing the single layer planet gear speed change system of the present invention.
Figure 3:
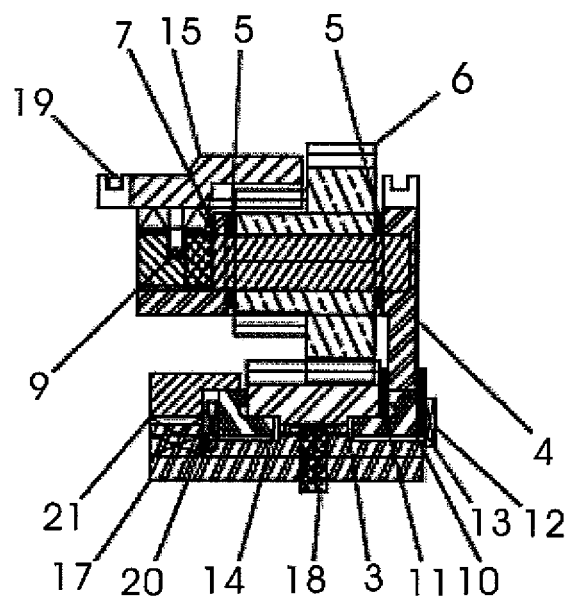
FIG. 3 is a cross sectional schematic view of the sing layer planet gear speed change system of the present invention after assembly.

As illustrated in FIGS. 1 to 3, an embodiment of embodiment is illustrated. In this embodiment, a three layer planet gear speed change system is used for description of the present invention. However, the present invention can be realized in a planet gear speed change system over three layers.

With reference to FIG. 1, a derailleur of the present invention includes a plurality of layers of planet gear speed change system. The present invention includes the following elements: a wheel axis 1, a track sleeve 2, sun gears 3, planet frames 4, washers 5, two layered planet gear 6, pins 7, ratchets 8, claw springs 9, right toggles 10, pads 11, position rings 12, washers 13, left toggles 14, inner teeth 15, outer casing interior teeth 16, axial ratchets 17, springs 18, positioning springs 19, buckling rings 20, a first ratchet control ring 21, a second ratchet control ring 22, a third ratchet control ring 23, input base 25, a large bearing 25, a small bearing 26, a small bearing seat 27, a chain disk 28, a control plate 29, a sleeve 30, a net 31, a casing 32, a distal bearing seat 33, a dust proof cover 34, and a chain disk positioning spring 35.

The interior of the interior derailleur has a first, a second and a third planet gear speed change systems. Each planet gear speed change system has same speed ratio so that they have identical modular structures as illustrated in FIGS. 2 and 3. As a result, the cost in develop and manufacturing is reduced greatly and the assembly work is simplified.

Figure 20:
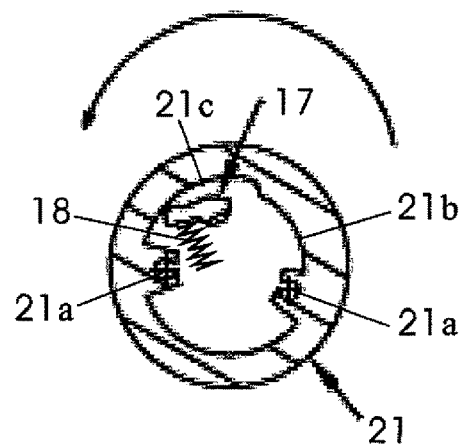
FIG. 20 is a schematic view showing that the first axial ratchet control ring is in an open stage.
Figure 21:
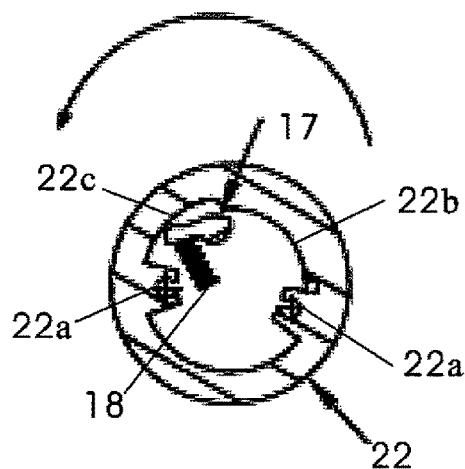
FIG. 21 is a schematic view showing that the second axial ratchet control ring is in an open stage.
Figure 22:
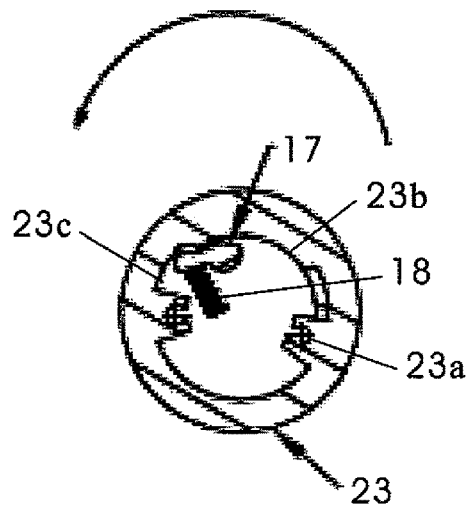
FIG. 22 is a schematic view showing that the third axial ratchet control ring is in an open stage.

Between a sun gear 3 of each planet gear speed change system and a wheel axis 1 of an interior derailleur is installed with an axial ratchet 17 for controlling separation and combination of the sun gear 3 and the axis 1. A spring 18 is installed between the axial ratchet 17 and the wheel shaft 1 so that the axial ratchet 17 are adhered to cams of the first ratchet control ring 21, the second ratchet control ring 22 and the third ratchet control ring 23, as illustrated in FIGS. 20, 21 and 22.

Figure 4:
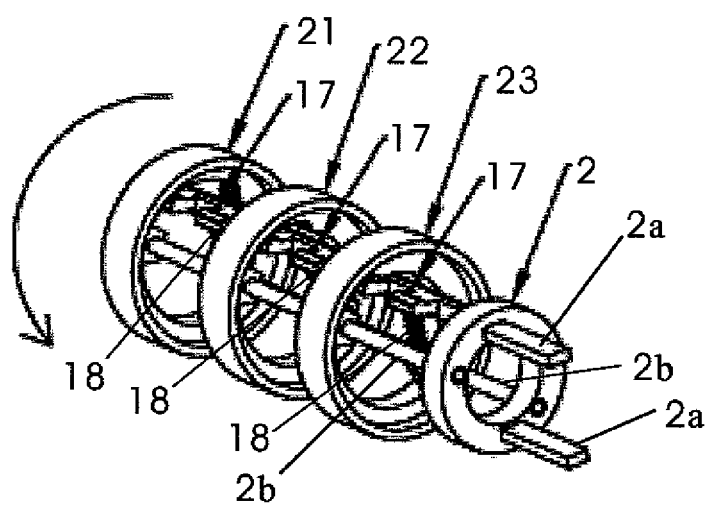
FIG. 4 shows the derailleur of the present invention.
Figure 5:
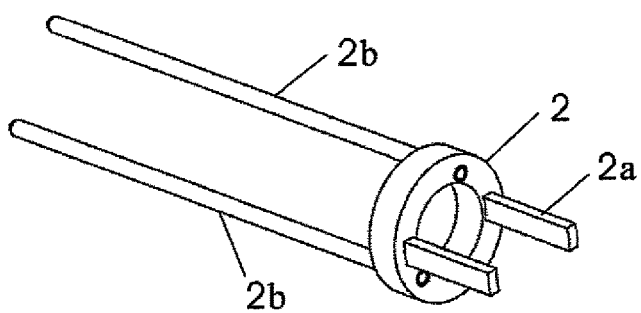
FIG. 5 is a perspective view of the track sleeve of the present invention.
Figure 6:
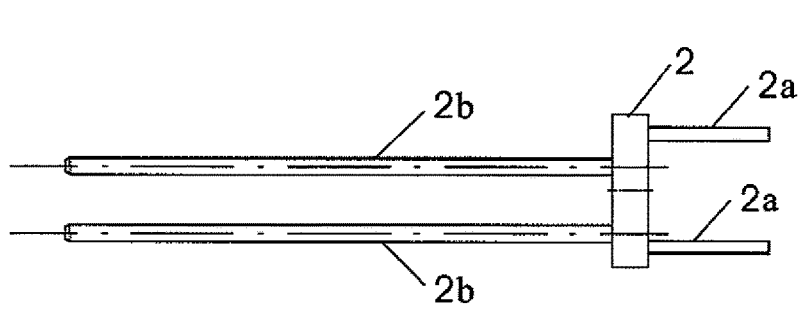
FIG. 6 shows the track sleeve of the present invention.
Figure 7:
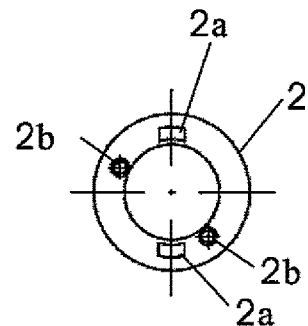
FIG. 7 is a right side view of FIG. 6.
Figure 8:
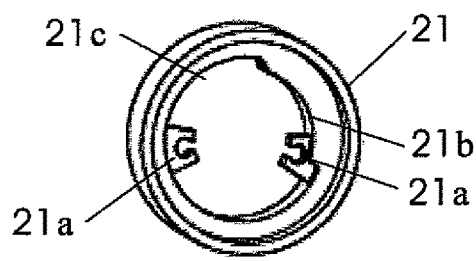
FIG. 8 is a perspective view showing the first axial ratchet control ring of the present invention.
Figure 11:
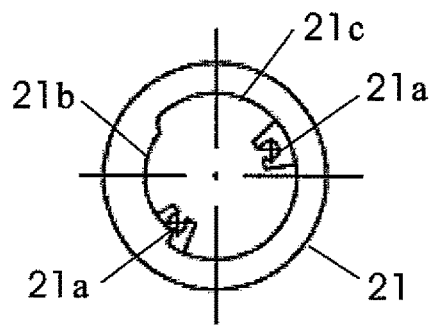
FIG. 11 is a left side view of FIG. 11.
Figures 9, 10:
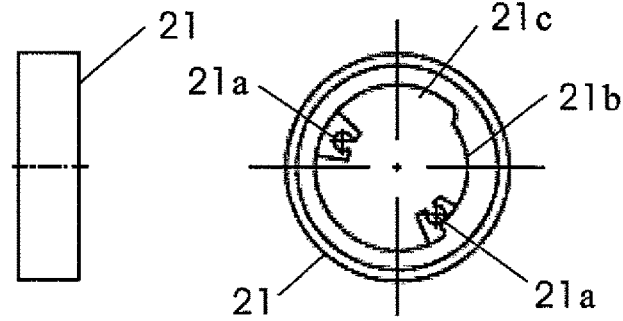
FIG. 9 is a front view of the first axial ratchet control ring of the present invention.
FIG. 10 is a right side view of FIG. 9.
Figure 12:
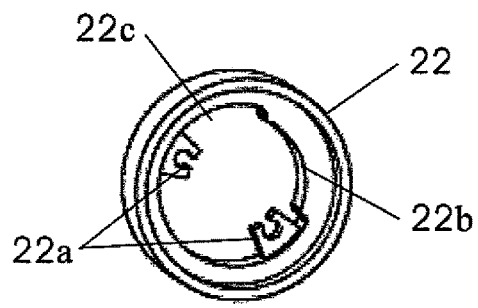
FIG. 12 is a perspective view showing the second axial ratchet control ring of the present invention.
Figure 15:
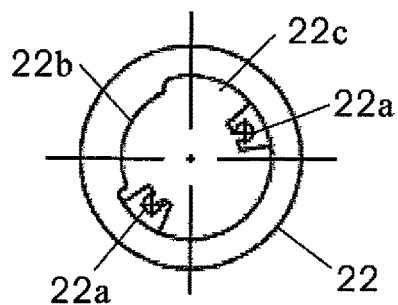
FIG. 15 is a left side view of FIG. 13.
Figure 13:
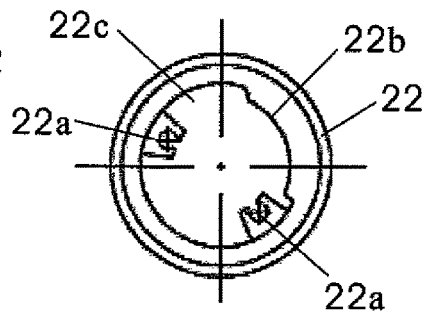
FIG. 13 is a front view of the second axial ratchet control ring of the present invention.
Figure 14:
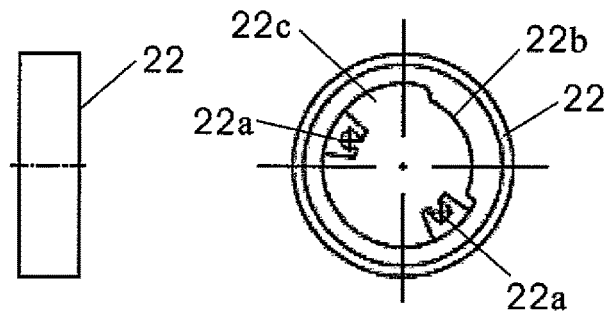
FIG. 14 is a right side view of FIG. 13.
Figure 16:
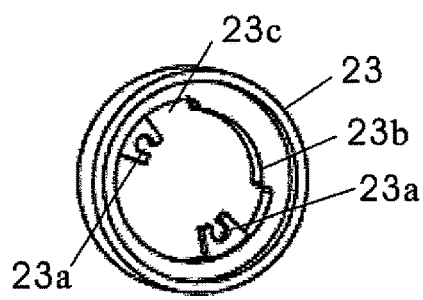
FIG. 16 is a perspective view showing the third axial ratchet control ring of the present invention.
Figure 19:
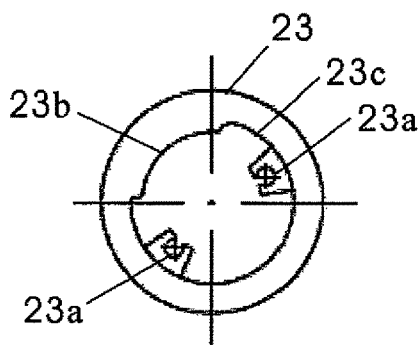
FIG. 19 is a left side view of FIG. 17.
Figure 17:
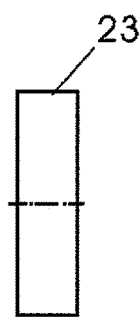
FIG. 17 is a front view of the third axial ratchet control ring of the present invention.
Figure 18:
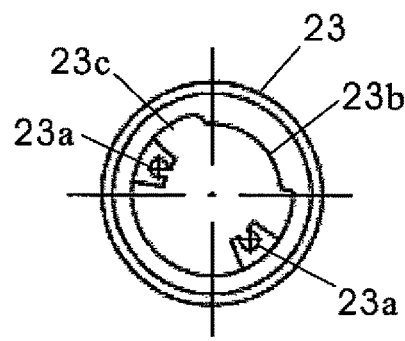
FIG. 18 is a right side view of FIG. 17.

With reference to FIG. 4, all the axial ratchets 17 are controlled by a gear switch control device as illustrated in FIGS. 4 to 7. The gear switch control device includes a track sleeve and the first axial ratchet control ring 21 (referring to FIGS. 8 to 11), the second axial ratchet control ring 22 (referring to FIGS. 12 to 15) and third axial ratchet control ring 23 (referring to FIGS. 16 to 19) which are all serial connected to the same track sleeve 2. Referring to FIGS. 5 to 7, one end of the track sleeve 2 has an external action portion 2a which is movable by external forces and another end thereof is installed with a linking rod 2b which serially connect all the axial ratchet control rings 21, 22 and 23.

Each of the axial ratchet control rings 21, 22 and 23 are formed with respective connecting holes 21a, 22a and 23a for receiving the track sleeve 2. Each of the first axial ratchet control ring 21, the second axial ratchet control ring 22 and the third axial ratchet control ring 23 is installed with a cam (or cam like device). These cams includes respective first, second and third derailleur closing surfaces 21b, 22b, and 23b and respective first, second and third derailleuring opening surfaces 21c, 22c, and 23c for derailleuring the axial ratchet 17 between the wheel axis 1 and respective sun gear 3. Movable radial ranges of the respective first, second and third derailleur closing surfaces 21b, 22b, and 23b are different from each other, and movable radial ranges of the respective first, second and third derailleur opening surfaces 21c, 22c, and 23c are different from each other With reference to FIGS. 23-1 to 23-4, it shows derailleuring states of the axial ratchets 17 between the wheel axis 1 and the sun gear 3 based on the structure relations for the first axial ratchet control ring 21, second axial ratchet control ring 23 and third axial ratchet control ring 23 in three different derailleuring positions from the first to fourth derailleuring positions.

Figures 1, 23:
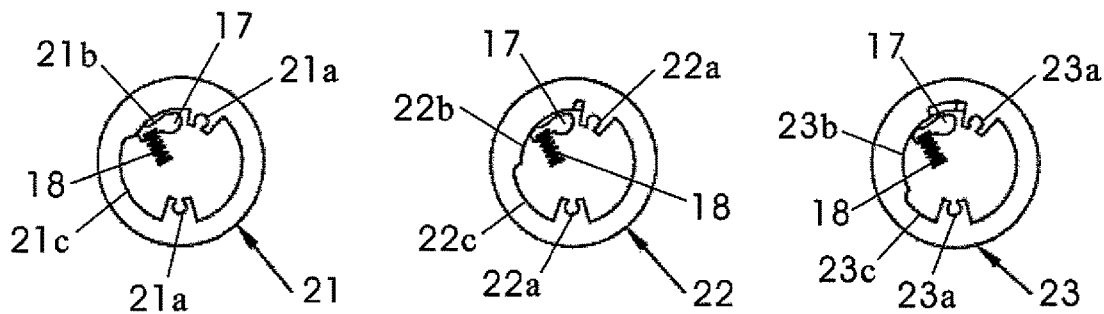
Figures 2, 23:
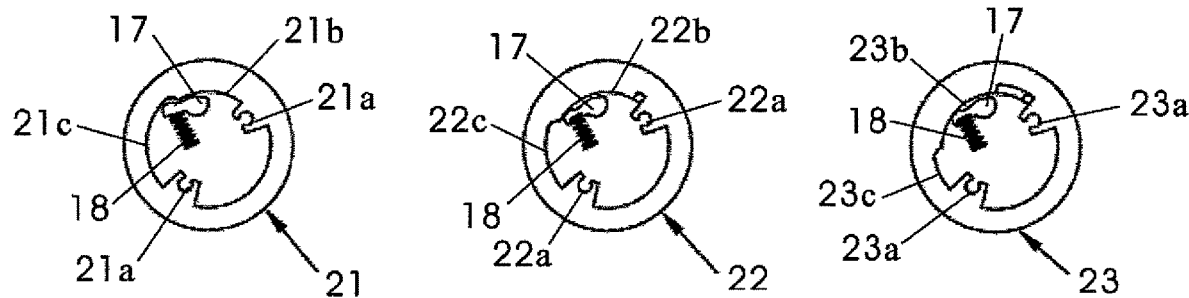
Figures 3, 23:
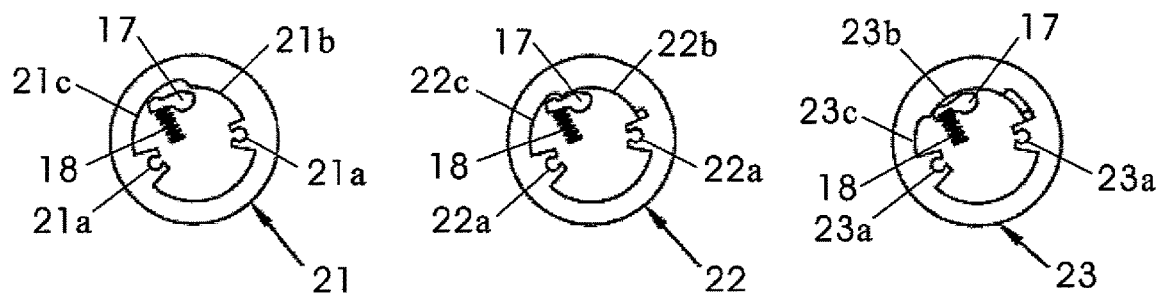
Figures 4, 23:
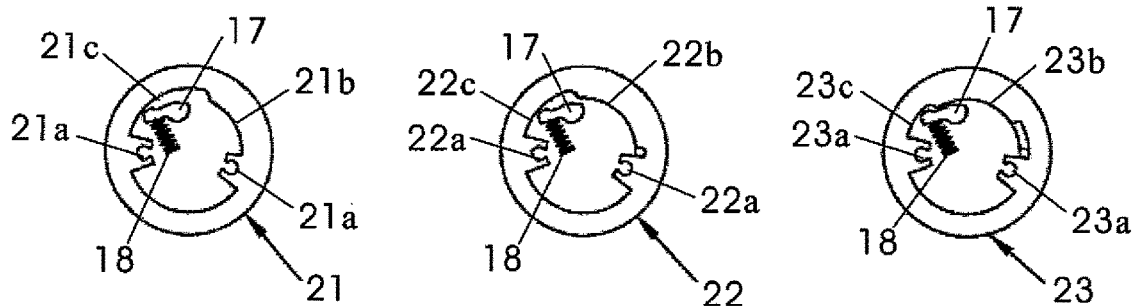

FIG. 23-1 shows the first derailleuring position, in that the track sleeve 2 dose not act. The axial ratchet 17 of the first planet gear speed change system is in the radial range of the derailleur closing surface 21b of the first axial ratchet control ring 21. Therefore the axial ratchet 17 of the first planet gear speed change system causes the sun gear 3 of the first planet gear speed change system is in a free state without being fixed. The axial ratchet 17 of the first planet gear speed change system is in the radial range of the derailleur closing surface 21b of the first axial ratchet control ring 21. Therefore the axial ratchet 17 causes the sun gear 3 of the first planet gear speed change system is in a free state without being fixed. The axial ratchet 17 of the second planet gear speed change system is in the radial range of the derailleur closing surface 22b of the second axial ratchet control ring 22. Therefore the axial ratchet 17 of the second planet gear speed change system causes the sun gear 3 of the second planet gear speed change system is in a free state without being fixed. The axial ratchet 17 of the third planet gear speed change system is in the radial range of the derailleur closing surface 23b of the third axial ratchet control ring 23. Therefore the axial ratchet 17 of the third planet gear speed change system causes the sun gear 3 of the third planet gear speed change system is in a free state without being fixed. That is, all the sun gears 3 are in free rotation state without being fixed. At this moment, speed ratio is 1.

FIG. 23-2 shows that the second derailleuring position, in that, the track sleeve 2 is in a second gear position as it is switched from a first gear position to the second gear position, the axial ratchet 17 of the first planet gear speed change system is in the in the radial range of the derailleur opening surface 21c of the first axial ratchet control ring 21, as a result, the axial ratchet 17 of the first planet gear speed change system causes that the sun gear 3 of the first planet gear speed change system is fixed. The axial ratchet 17 of the second planet gear speed change system is within the radial range of the derailleur closing surface 22b of the second axial ratchet control ring 22 so that the axial ratchet 17 of the second planet gear speed change system causes that the sun gear 3 of the second planet gear speed change system is in a free rotating state. The axial ratchet 17 of the third planet gear speed change system is within the radial range of the derailleur closing surface 23b of the third axial ratchet control ring 23, as a result, the axial ratchet 17 of the third planet gear speed change system causes the sun gear 3 of the third planet gear speed change system is in a free rotating state. At this moment, the axial ratchet 17 of the first planet gear speed change system is in a derailleur opening state, that is, the sun gear 3 of the first planet gear speed change system is fixed, while the axial ratchets 17 of the second and third planet gear speed change systems are in derailleur closing state, that is, the sun gears of the second and third planet gear speed change systems are in a free rotation state, and the speed ratio of a.

FIG. 23-3 shows that the track sleeve 2 of the gear switching control structure is switched from second gear position to third gear position. In the third gear position, the axial ratchets 17 of the first and second planet gear speed change system is within a radial range of the derailleur opening surface 21c of the first axial ratchet control ring 21 so that the axial ratchets 17 of the first and second planet gear speed change system causes that the sun gears 3 of the first and second planet gear speed change system are fixed. The axial ratchet 17 of the third planet gear speed change system is positioned within the radial range of the derailleur closing surface 23b of the third axial ratchet control ring 23 so that axial ratchet 17 of the third planet gear speed change system causes that the sun gear 3 of the third planet gear speed change system is still in a free rotation state. At this time, the axial ratchets 17 of the first and second planet gear speed change system is in a derailleur opening state, that is, the sun gear 3 is in a fixed state, while the axial ratchet 17 of the third planet gear speed change system is in a derailleur closing state and the sun gear 3 thereof is in a free rotation state. At this moment, the speed ratio is square a (a to the power of 2).

FIG. 23-4 shows that the track sleeve 2 of the gear switching control structure is switched from third gear position to fourth gear position. In the fourth gear position, the axial ratchets 17 of the first planet gear speed change system is positioned in a radial range of the derailleur opening surface 21c of the first axial ratchet control ring 21, thereby, the axial ratchet 17 of the first planet gear speed change system causes the sun gear 3 of the first planet gear speed change system is in a fixed state. The axial ratchet 17 of the second planet gear speed change system is positioned in a radial range of the derailleur opening surface 22c of the second axial ratchet control ring so that the axial ratchet 17 of the second planet gear speed change system causes that the sun gear 3 of the second planet gear speed change system is in a fixed state. The axial ratchet 17 of the third planet gear speed change system is positioned in the radial range of the derailleur opening surface 23c of the third axial ratchet control ring, as a result, the axial ratchet 17 of the third planet gear speed change system causes that the sun gear 3 of the third planet gear speed change system is in a fixed state. At this moment, the axial ratchets 17 of the first to third planet gear speed change system are in a derailleur opening state. That is, all the sun gears 3 are in a fixed state. Now, the speed ratio is a to the power of 3.

The FIGS. 23-1 to 23-4 show the operation from a low gear level to a high gear level and show the gear variations of the axial ratchets 17 of various planet gear speed change systems. However, it is desired to have the result of high gear level to low gear level, the sequence is those from FIGS. 23-4 to 23-1 along a reverse order.

Advantages of the present invention are that: the present invention could resolve the problem induced from the gear change of internal derailleurs of two layer planet gear speed change system. The present invention has a simple structure, lower torque, and lower power which is novel, practical and progressive. Each layer of the planet gear speed change system has identical speed change ratio and as a result, and thus they have same module structure. The cost is reduced effectively and the manufacturing steps are simplified. The present invention is useful and economic.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A gear switching control device of an internal derailleur, comprising:
   a plurality of planet gear speed change systems;
   a gear switching control unit;
   a plurality of axial ratchet control rings a number of which is identical that of the planet gear speed change systems for controlling action of a plurality of axial ratchets;
   a plurality of axial ratchets the number of which is identical to that of the axial ratchet control rings; and the plurality of axial ratchet control rings are serially connected by the same gear switching control unit; characteristic in that:
   a gear switching control unit comprising: a track sleeve (2), one end of the track sleeve (2) is installed with force accept portion (2a) and another end thereof is installed with a linking rod (2b) which is used to serially connected the plurality of axial ratchet control rings (21, 22 and 23); and
   each of the axial ratchet control rings (21, 22 and 23) is formed with a respective connecting holes (21a, 22a and 23a); each axial ratchet control ring (21, 22 and 23) being installed a cam or cam-like device; said cam having different operating moving range.

2. The gear switching control device of an internal derailleur as claimed in claim 1, wherein an interior of the internal derailleur includes the plurality of planet gear speed change systems, between a sun gear (3) of each planet gear speed change system has a sun gear (3) and a wheel shaft (1) of the internal derailleur is installed with a respective axial ratchet (17); all the axial ratchets (17) are controlled by the same track sleeve (2).

3. The gear switching control device of an internal derailleur as claimed in claim 1, wherein each of the axial ratchet control rings (21, 22 and 23) are formed with the respective connecting holes (21a, 22a and 23a) for receiving the track sleeve (2); each of the axial ratchet control ring (21), the second axial ratchet control ring (22) and the third axial ratchet control ring (23) is installed with the cam or cam like device; each of these cams or cam-like devices includes respective derailleur closing surfaces (21b, 22b, and 23b) and respective derailleuring opening surfaces (21c, 22c, and 23c) for derailleuring the axial ratchet (17); moving radial ranges of the respective derailleur closing surfaces (21b, 22b, and 23b) are different from each other, and moving radial ranges of the respective derailleur opening surfaces (21c, 22c, and 23c) are different from each other.

4. The gear switching control device of an internal derailleur as claimed in claim 1, wherein there are three planet gear speed change systems in the internal derailleur; in the first gear position, in that the track sleeve (2) does not act; the axial ratchet (17) of the first planet gear speed change system is in the radial range of the derailleur closing surface (21b) of the first axial ratchet control ring (21); therefore the axial ratchet (17) of the first planet gear speed change system causes the sun gear (3) of the first planet gear speed change system is in a free state without being fixed; the axial ratchet (17) of the second planet gear speed change system is in the radial range of the derailleur closing surface (22*b*) of the second axial ratchet control ring (22); therefore the axial ratchet (17) of the second planet gear speed change system causes the sun gear (3) of the second planet gear speed change system is in a free state without being fixed; the axial ratchet (17) of the third planet gear speed change system is in the radial range of the derailleur closing surface (23*b*) of the third axial ratchet control ring (23); therefore the axial ratchet (17) of the third planet gear speed change system causes the sun gear (3) of the third planet gear speed change system is in a free state without being fixed; that is, all the sun gears (3) are in free rotation state without being fixed.

5. The gear switching control device of an internal derailleur as claimed in claim 1, wherein there are three planet gear speed change systems in the internal derailleur; in a second position, the track sleeve (2) is in a second gear position as it is switched from a first gear position to the second gear position, the axial ratchet (17) of the first planet gear speed change system is in the in the radial range of the derailleur opening surface (21*c*) of the first axial ratchet control ring (21), as a result, the axial ratchet (17) of the first planet gear speed change system causes that the sun gear (3) of the first planet gear speed change system is fixed; the axial ratchet (17) of the second planet gear speed change system is within the radial range of the derailleur closing surface (22*b*) of the second axial ratchet control ring (22) so that the axial ratchet (17) of the second planet gear speed change system causes that the sun gear (3) of the second planet gear speed change system is in a free rotating state; the axial ratchet (17) of the third planet gear speed change system is within the radial range of the derailleur closing surface (23*b*) of the third axial ratchet control ring (23), as a result, the axial ratchet (17) of the third planet gear speed change system causes the sun gear (3) of the third planet gear speed change system is in a free rotating state; at this moment, the axial ratchet (17) of the first planet gear speed change system is in a derailleur opening state, that is, the sun gear (3) of the first planet gear speed change system is fixed, while the axial ratchets (17) of the second and third planet gear speed change systems are in derailleur closing state, that is, the sun gears of the second and third planet gear speed change systems are in a free rotation state.

6. The gear switching control device of an internal derailleur as claimed in claim 1, wherein there are three planet gear speed change systems in the internal derailleur; the track sleeve (2) of the gear switching control structure is switched from second gear position to third gear position; in the third gear position, the axial ratchets (17) of the first and second planet gear speed change system is within a radial range of the derailleur opening surface (21*c*) of the first axial ratchet control ring (21) so that the axial ratchets (17) of the first and second planet gear speed change system causes that the sun gears (3) of the first and second planet gear speed change system are fixed; the axial ratchet (17) of the third planet gear speed change system is positioned within the radial range of the derailleur closing surface (23*b*) of the third axial ratchet control ring (23) so that axial ratchet (17) of the third planet gear speed change system causes that the sun gear (3) of the third planet gear speed change system is still in a free rotation state; at this time, the axial ratchets (17) of the first and second planet gear speed change system is in a derailleur opening state, that is, the sun gear (3) is in a fixed state, while the axial ratchet (17) of the third planet gear speed change system is in a derailleur closing state and the sun gear (3) thereof is in a free rotation state.

7. The gear switching control device of an internal derailleur as claimed in claim 1, wherein there are three planet gear speed change systems in the internal derailleur; the track sleeve (2) of the gear switching control structure is switched from third gear position to fourth gear position; in the fourth gear position, the axial ratchets (17) of the first planet gear speed change system is positioned in a radial range of the derailleur opening surface (21*c*) of the first axial ratchet control ring (21), thereby, the axial ratchet (17) of the first planet gear speed change system causes the sun gear (3) of the first planet gear speed change system is in a fixed state; the axial ratchet (17) of the second planet gear speed change system is positioned in a radial range of the derailleur opening surface (22*c*) of the second axial ratchet control ring so that the axial ratchet (17) of the second planet gear speed change system causes that the sun gear (3) of the second planet gear speed change system is in a fixed state; the axial ratchet (17) of the third planet gear speed change system is positioned in the radial range of the derailleur opening surface (23*c*) of the third axial ratchet control ring, as a result, the axial ratchet (17) of the third planet gear speed change system causes that the sun gear (3) of the third planet gear speed change system is in a fixed state; at this moment, the axial ratchets (17) of the first to third planet gear speed change system are in a derailleur opening state; that is, all the sun gears (3) are in a fixed state.

\* \* \* \* \*